(12) United States Patent
Jiang et al.

(10) Patent No.: US 12,074,547 B2
(45) Date of Patent: Aug. 27, 2024

(54) DRIVING CIRCUIT AND METHOD, FREQUENCY CONVERTER, DEVICE AND COMPUTER READABLE STORAGE MEDIUM

(71) Applicant: GREE ELECTRIC APPLIANCES, INC. OF ZHUHAI, Zhuhai (CN)

(72) Inventors: Yingyi Jiang, Zhuhai (CN); Peiyu Dang, Zhuhai (CN); Yongying Guo, Zhuhai (CN); Yu Liu, Zhuhai (CN); Songru Huang, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 329 days.

(21) Appl. No.: 17/435,920

(22) PCT Filed: Aug. 24, 2020

(86) PCT No.: PCT/CN2020/110906
§ 371 (c)(1),
(2) Date: Sep. 2, 2021

(87) PCT Pub. No.: WO2021/114720
PCT Pub. Date: Jun. 17, 2021

(65) Prior Publication Data
US 2022/0255483 A1 Aug. 11, 2022

(30) Foreign Application Priority Data
Dec. 13, 2019 (CN) .......................... 201911286180.3

(51) Int. Cl.
*H02P 27/04* (2016.01)
*H02M 1/08* (2006.01)
(Continued)

(52) U.S. Cl.
CPC .............. *H02P 27/06* (2013.01); *H02M 1/08* (2013.01); *H02M 7/219* (2013.01); *H02M 7/53871* (2013.01)

(58) Field of Classification Search
CPC ... H02P 27/06; H02M 7/53871; H02M 7/219; H02M 1/08
USPC ......................................................... 318/503
See application file for complete search history.

(56) References Cited

U.S. PATENT DOCUMENTS

| | | | | |
|---|---|---|---|---|
| 5,694,307 A | * | 12/1997 | Murugan ................ | H02M 7/10 363/37 |
| 2012/0187886 A1 | * | 7/2012 | Mack ...................... | H02P 27/06 318/503 |

(Continued)

FOREIGN PATENT DOCUMENTS

| | | |
|---|---|---|
| CN | 201126981 Y | 10/2008 |
| CN | 105515167 A | 4/2016 |

(Continued)

OTHER PUBLICATIONS

Extended European Search Report issued May 3, 2022 in European Patent Application No. 20897834.6, 9 pages.

(Continued)

*Primary Examiner* — Gabriel Agared
(74) *Attorney, Agent, or Firm* — Oblon, McClelland, Maier & Neustadt, L.L.P.

(57) ABSTRACT

The present disclosure relates to a driving circuit and method, a frequency converter, a device and a computer readable storage medium. The circuit includes: a rectifier unit including a first input terminal, a second input terminal and an output terminal, wherein the output terminal of the rectifier unit is connected to an input terminal of the inverter unit, and the second input terminal of the rectifier unit is connected to the input terminal of the inverter unit a first (Continued)

switch arranged between the first input terminal of the rectifier unit and an output terminal of the inverter unit, and configured to control the driving circuit to switch between a series mode and a parallel mode by being switched on or off; the inverter unit with the output terminal connected to a load; and a capacitor connected in parallel between the rectifier unit and the inverter unit.

20 Claims, 4 Drawing Sheets

(51) Int. Cl.
*H02M 7/219* (2006.01)
*H02M 7/5387* (2007.01)
*H02P 27/06* (2006.01)

(56) References Cited

U.S. PATENT DOCUMENTS

2014/0292246 A1* 10/2014 Chae ............... H02H 7/0838
  318/504
2015/0048767 A1* 2/2015 Takezawa ............... H02P 6/14
  327/109
2015/0263568 A1 9/2015 Colombi et al.
2019/0199086 A1* 6/2019 Li ........................ H02M 7/003
2019/0341873 A1* 11/2019 Cox ..................... H02J 7/0013

FOREIGN PATENT DOCUMENTS

| CN | 106410952 A | 2/2017 |
| CN | 206820473 U | 12/2017 |
| CN | 107732950 A | 2/2018 |
| CN | 207150248 U | 3/2018 |
| CN | 110148944 A | 8/2019 |
| CN | 111313796 A | 6/2020 |
| EP | 2 919 350 A1 | 9/2015 |
| JP | 2005-86969 A | 3/2005 |
| KR | 10-0981792 B1 | 9/2010 |

OTHER PUBLICATIONS

International Search Report issued on Nov. 25, 2020 in PCT/CN2020/110906 filed on Aug. 24, 2020, 2 pages.

* cited by examiner

DRIVING CIRCUIT AND METHOD, FREQUENCY CONVERTER, DEVICE AND COMPUTER READABLE STORAGE MEDIUM

CROSS-REFERENCE TO RELATED APPLICATIONS

The present application is a National Stage of International Application No. PCT/CN2020/110906 filed on Aug. 24, 2020, which claims the priority of the Chinese patent application No. 201911286180.3 filed on Dec. 13, 2019, both of which are incorporated herein by reference in their entireties.

TECHNICAL FIELD

The present invention relates to the field of electronic and power technology, and in particular, to a driving circuit and method, a frequency converter, a device and a computer-readable storage medium.

BACKGROUND

In the case where the technology of current conversion is rapidly developed along with the development of the power electronic technology, there will be more and more DC (direct current) power supply systems. In the related art as shown in FIG. 1 known to the inventors, the frequency converter with DC power supply in this related art is modified from the existing AC(alternating current) input frequency converter, wherein the AC frequency converter is divided into a rectifier unit and an inverter unit. The rectifier unit is configured to convert an AC voltage into a DC voltage. It is also possible to input direct current from a front terminal of the rectifier unit, and the rectifier unit is switched on by the diode inside the module, the rectifier unit can prevent a reversed connection and can implement driving the motor by direct current.

SUMMARY

The present disclosure provides a driving circuit, comprising: a rectifier unit comprising a first input terminal, a second input terminal and an output terminal, wherein the output terminal of the rectifier unit is connected to an input terminal of an inverter unit, and the second input terminal of the rectifier unit is connected to the input terminal of the inverter unit; a first switch arranged between the first input terminal of the rectifier unit and an output terminal of the inverter unit, and configured to control the driving circuit to switch between a series mode and a parallel mode by being switched on or off; the inverter unit with the output terminal connected to a load; and a capacitor connected in parallel between the rectifier unit and the inverter unit.

In some embodiments of the present disclosure, the circuit further comprises: a second switch, wherein one terminal of the second switch is connected to a DC power supply, and the other terminal is alternatively connected to the first input terminal or the second input terminal of the rectifier unit.

In some embodiments of the present disclosure, the second switch is a double-pole double-throw switch.

In some embodiments of the present disclosure, the rectifier unit comprises a three-phase rectifier bridge circuit.

In some embodiments of the present disclosure, the inverter unit comprises a three-phase inverter bridge circuit.

The present disclosure further provides a driving circuit, comprising: a rectifier unit comprising a first input terminal, a second input terminal and an output terminal; an inverter unit comprising an input terminal and an output terminal, wherein the input terminal of the inverter unit is connected to the output terminal and the second input terminal of the rectifier unit, and the output terminal of the inverter unit is connected to a load; a first switch arranged between the first input terminal of the rectifier unit and the output terminal of the inverter unit, and configured to control the driving circuit to switch between a series mode and a parallel mode by being switched on or off; and a capacitor connected in parallel between the rectifier unit and the inverter unit.

The present disclosure further provides a frequency converter, comprising the driving circuit according to any of the above-described embodiments.

The present disclosure further provides a device comprising an motor, wherein the device further comprises the frequency converter according to any of the above-described embodiments.

The present disclosure further provides a driving method applied to the driving circuit according to any of the above-described embodiments, wherein the method comprises the steps of: controlling a rectifier unit to charge a capacitor in a series mode, wherein the capacitor is connected in parallel between the rectifier unit and an inverter unit; controlling a second input terminal of the control rectifier unit to be connected to a DC power supply after charging is completed; and controlling a first input terminal of the rectifier unit to be connected to an output terminal of the inverter unit so as to further control the driving circuit to switch to a parallel mode.

In some embodiments of the present disclosure, the step of controlling a rectifier unit to charge a capacitor in a series mode comprises: controlling the first input terminal of the rectifier unit to be connected the DC power supply, so as to charge the capacitor.

In some embodiments of the present disclosure, the step of controlling a first input terminal of the rectifier unit to be connected to an output terminal of the inverter unit comprises: controlling two poles of the second switch to be thrown to two connection terminals of the first input terminal of the rectifier unit; wherein one terminal of the second switch is connected to the DC power supply, and the other terminal is alternatively connected to the first input terminal or the second input terminal of the rectifier unit.

In some embodiments of the present disclosure, the step of controlling a second input terminal of the control rectifier unit to be connected to a DC power supply after charging is completed comprises: controlling two poles of the second switch to be thrown to two connection terminals of the second input terminal of the rectifier unit; wherein one terminal of the second switch is connected to the DC power supply, and the other terminal is alternatively connected to the first input terminal or the second input terminal of the rectifier unit.

In some embodiments of the present disclosure, the step of controlling a first input terminal of the rectifier unit to be connected to an output terminal of the inverter unit so as to further control the driving circuit to switch to a parallel mode comprises: controlling the first switch to be switched on, wherein the first switch is arranged between the input terminal of the rectifier unit and the output terminal of the inverter unit.

In some embodiments of the present disclosure, after the step of controlling a first input terminal of the rectifier unit to be connected to an output terminal of the inverter unit so as to further control the driving circuit to switch to a parallel mode, the method further comprises: controlling the first switch to be switched off; and controlling the first input terminal of the first rectifier unit to be connected to the DC power supply so as to further control the driving circuit to a series mode.

The present disclosure further provides a driving method applied to the driving circuit according to any of the above-described embodiments, wherein the method comprises the steps of: controlling a second input terminal of a rectifier unit to be connected to a DC power supply; and controlling a first input terminal of the rectifier unit to be connected to an output terminal of an inverter unit so as to further control the driving circuit to switch to a parallel mode.

In some embodiments of the present disclosure, the driving method further comprises: controlling the first input terminal of the rectifier unit to be connected to the DC power supply; and controlling the first input terminal of the rectifier unit to be disconnected from the output terminal of the inverter unit so as to further control the driving circuit to switch to the series mode.

The present disclosure further provides a computer-readable storage medium having a computer program stored thereon, wherein the program when executed by a processor implements the method according to any of the above-described embodiments.

BRIEF DESCRIPTION OF THE DRAWINGS

In order to more explicitly explain the embodiments of the present disclosure or the technical solutions in the relevant art, a brief introduction will be given below for the accompanying drawings required to be used in the description of the embodiments or the relevant art. It is obvious that, the accompanying drawings described as follows are merely some of the embodiments of the present disclosure. For those skilled in the art, other accompanying drawings may also be obtained according to such accompanying drawings on the premise that no inventive effort is involved.

DETAILED DESCRIPTION

The technical solution in the embodiments of the present disclosure will be explicitly and completely described below in conjunction with the accompanying drawings in the embodiments of the present disclosure. Apparently, the embodiments described are merely some of the embodiments of the present disclosure, rather than all the embodiments. The following descriptions of at least one exemplary embodiment which are in fact merely illustrative, shall by no means serve as any delimitation on the present disclosure as well as its application or use. On the basis of the embodiments of the present disclosure, all the other embodiments obtained by those skilled in the art on the premise that no inventive effort is involved shall fall into the protection scope of the present disclosure.

Unless otherwise specified, the relative arrangements, numerical expressions and numerical values of the components and steps expounded in these examples shall not limit the scope of the present invention.

At the same time, it should be understood that, in order to facilitate the description, the dimensions of various parts shown in the accompanying drawings are not delineated according to actual proportional relations.

The techniques, methods, and apparatuses known to those of ordinary skill in the relevant art might not be discussed in detail. However, the techniques, methods, and apparatuses shall be considered as a part of the granted description where appropriate.

Among all the examples shown and discussed here, any specific value shall be construed as being merely exemplary, rather than as a delimitation. Thus, other examples in the exemplary embodiments may have different values.

It is to be noted that: similar reference signs and letters present similar items in the following accompanying drawings, and therefore, once an item is defined in one accompanying drawing, it is necessary to make further discussion on the same in the subsequent accompanying drawings.

Figure 1:
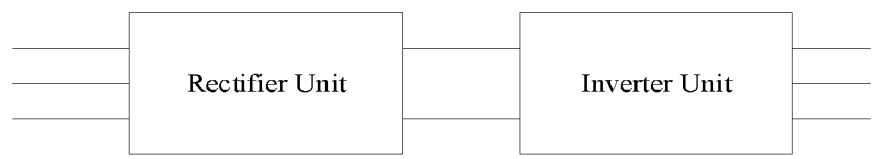
FIG. 1 is a structural view of a frequency converter in the prior art.

The inventors have found through studies that, in the related technical solution shown in FIG. 1, there is an idle rectifier unit at a front end, such that the rectifier unit actually has no practical effect on the DC input motor after the voltage is changed from alternating current to direct current. That is, the rectifier unit is idle in the circuit and thus cannot be used.

In view of the technical problem that the rectifier unit is idle when the AC input frequency converter is changed to the DC input frequency converter in the related art, the present disclosure provides a driving circuit and method, a frequency converter, a device and a computer readable storage medium to solve the problem that the rectifier unit is idle when the AC input frequency converter is changed to the DC input frequency converter in the related art.

The alternative embodiments of the present disclosure will be described in detail below in conjunction with the accompanying drawings.

Figure 2:
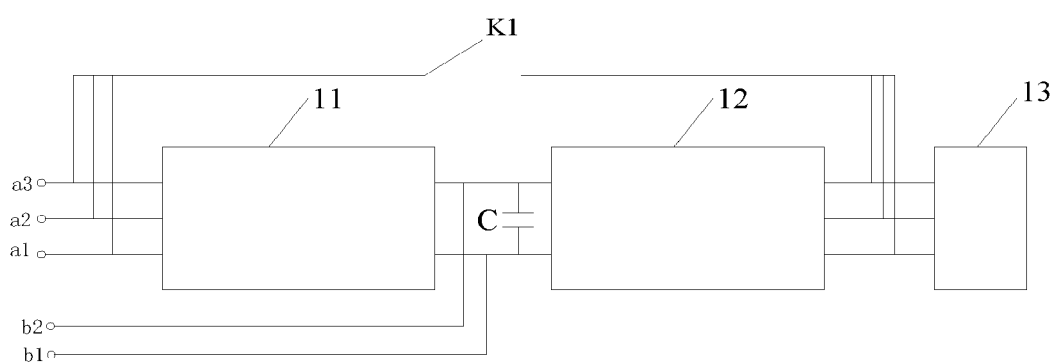
FIG. 2 is a structural view of a driving circuit according to some embodiments of the present disclosure.

FIG. 2 is a structural view of a driving circuit according to some embodiments of the present disclosure. As shown in FIG. 2, the driving circuit comprises a rectifier unit 11, an inverter unit 12, a first switch K1 and a capacitor C, wherein:

The rectifier unit 11 comprises a first input terminal, a second input terminal and an output terminal.

The inverter unit 12 comprises an input terminal and an output terminal. The input terminal of the inverter unit is connected to the output terminal and the second input terminal of the rectifier unit, and the output terminal of the inverter unit is connected to a load 13.

The first switch K1 is arranged between the first input terminal of the rectifier unit and the output terminal of the inverter unit, and configured to control the driving circuit to switch between a series mode and a parallel mode by being switched on or off.

The capacitor C is connected in parallel between the rectifier unit 11 and the inverter unit 12.

In some embodiments of the present disclosure, as shown in FIG. 2, the technical content that the capacitor C connected in parallel between the rectifier unit 11 and the inverter unit 12 refers to: the rectifier unit 11 and the inverter unit 12 are connected by two connecting wires to which two terminals of the capacitor C are respectively connected.

In some embodiments of the present disclosure, a driving circuit capable of switching a driving mode is provided. FIG. 2 is a structural view of a driving circuit according to some embodiments of the present disclosure. As shown in FIG. 2, the driving circuit comprises: a rectifier unit 11 comprising a first input terminal and an output terminal, wherein the first input terminal comprises a first connection terminal a1, a second connection terminal a2 and a third connection terminal a3, the output terminal of the rectifier unit 11 is connected to the input terminal of the inverter unit 12, the circuit between the rectifier unit 11 and the inverter unit 12 is connected to the second input terminal of the rectifier unit 11, and the second input terminal comprises a fourth connection terminal b1 and a fifth connection terminal b2; a first switch K1 arranged between the first input terminal of the rectifier unit 11 and the output terminal of the inverter unit 12, and configured to control the driving circuit to switch between a series mode and a parallel mode by being switched on or off, and the output terminal of the inverter unit 12 is connected to a load; a capacitor C connected in parallel between the rectifier unit and the inverter unit, such that the capacitor C is charged by the rectifier unit 11.

In some specific embodiments of the present disclosure, in the series mode, the first switch K1 is switched off, and the first connection terminal a1 and the second connection terminal a2 of the first input terminal of the rectifier unit 11 are connected to the DC power supply. The rectifier unit 11 and the inverter unit 12 are connected in series between the DC power supply and the load 13, and direct current is first passed through the rectifier unit 11 and then passed through the inverter unit 12 such as to be converted into alternating current, and output to the load 13. In the parallel mode, the first switch K1 is switched on, and the fourth connection terminal b1 and the fifth connection terminal b2 of the second input terminal of the rectifier unit 11 are connected to the DC power supply. The rectifier unit 11 and the inverter unit 12 are connected in parallel between the DC power supply and the load 13, wherein one route of direct current is passed through the inverter unit 12 such that direct current is converted into alternating current, and output to the load 13; and the other route of direct current is passed through the second input terminal of the rectifier unit 11, and then passed through the first connection terminal a1, the second connection terminal a2, and the third connection terminal a3 of the first input terminal of the rectifier unit 11, and output to the load 13. Since the second input terminal of the rectifier unit 11 is connected to the output terminal of the original rectifier unit 11, the first input terminal is connected to the load 13 through the first switch K1, when the driving circuit is switched from the series mode to the parallel mode, the original output terminal of the rectifier unit 11 becomes a DC input terminal, and the original first input terminal becomes an AC output terminal. The initial function of the rectifier unit 11 is to convert alternating current to direct current. After the input terminal and the output terminal are interchanged, the function of the rectifier unit is to convert direct current to alternating current, and thus is the same as the function of the inverter unit 12.

In some embodiments of the present disclosure, the rectifier unit 11 serves as a standby inverter unit. When the inverter unit 12 in the circuit is malfunctioned and cannot be used normally, the output terminal of the rectifier unit 11 is connected to the second input terminal of the rectifier unit 11, and the first input terminal of the rectifier unit 11 is controlled to be connected to the load 13, such that the rectifier unit 11 realizes the function of converting direct current to alternating current so as to drive the load.

In the driving circuit of this embodiment, the second input terminal of the rectifier unit is led out between the output terminal of the existing rectifier unit and the input terminal of the inverter unit, and a first switch is provided between the input terminal of the rectifier unit and the output terminal of the inverter unit, the second input terminal or the second input terminal of the rectifier unit is controlled to be switched on to realize the switching between a series mode and a parallel mode of the driving circuit, so that the idle rectifier unit is converted into a standby inverter unit so as to be fully utilized.

Figure 3:
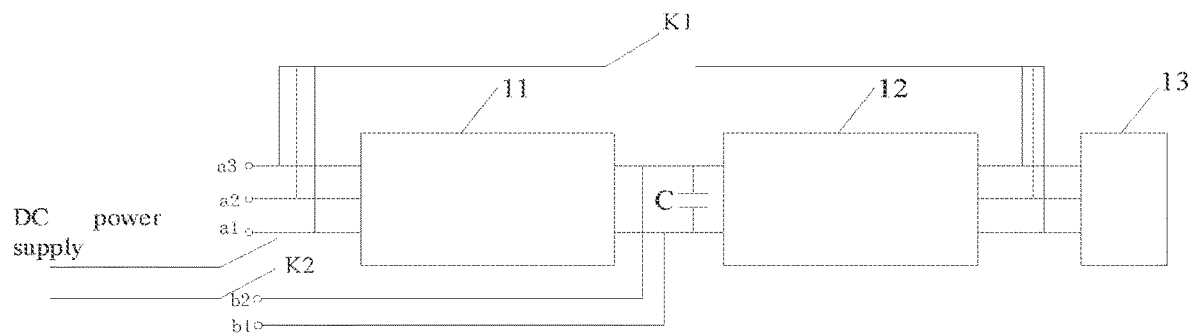
FIG. 3 is a structural view of a driving circuit according to other embodiments of the present disclosure.

In some embodiments of the present disclosure, another driving circuit capable of switching a driving mode is provided. FIG. 3 is a structural view of a driving circuit according to other embodiments of the present disclosure, in order to realize the switching between a series mode and a parallel mode using the same DC power supply.

As shown in FIG. 3, based on the above-described embodiment, the circuit further comprises: a second switch K2, one terminal of which is connected to the DC power supply, and the other terminal is alternatively connected to the first input terminal or the second input terminal of the rectifier unit 11. When it is required to switch to the series mode, one terminal of the second switch K2 is controlled to be connected to the DC power supply, and the other terminal is controlled to be connected to the first input terminal of the rectifier unit 11, so that direct current is sequentially passed through the rectifier unit 11 and the inverter unit 12, and then output to the load 13. When it is required to switch to the parallel mode, one terminal of the second switch K2 is connected to the DC power supply, and the other terminal is connected to the second input terminal of the rectifier unit 11, so that direct current is passed through the rectifier unit 11 and the inverter unit 12 respectively, and then output to the load.

In some specific embodiments of the present disclosure, in order to achieve simultaneous switching of the two connection points, the second switch K2 is a double-pole double-throw (DPDT) switch. When it is required to switch to the series mode, one terminal of the second switch K2 is controlled to be connected to the DC power, one of the poles of the other terminal of the second switch K2 is thrown to the first connection terminal a1 of the first input terminal of the rectifier unit 11, and the other pole is thrown to the second connection terminal of the first input terminal a2 of the rectifier unit 11. When it is required to switch to the parallel mode, one terminal of the second switch K2 is controlled to be connected to the DC power supply, and one of the poles of the other terminal of the second switch K2 is thrown to the fourth connection terminal b1 of the second input terminal of the rectifier unit 11, and the other pole is thrown to the fifth connection terminal b2 of the second input terminal of the rectifier unit 11.

It should be noted that, the above are only some embodiments of the present disclosure. In other embodiments, the second switch K2 comprises a first sub-switch, a second sub-switch, a third sub-switch, and a fourth sub-switch, which are arranged between the first connection terminal a1, the second connection terminal a2, the fourth connection terminal b1, the fifth connection terminal b2 and the DC power supply respectively. In the series mode, the first sub-switch and the second sub-switch are controlled to be switched on. In the parallel mode, the third sub-switch and the fourth sub-switch are controlled to be switched on.

Figure 4:
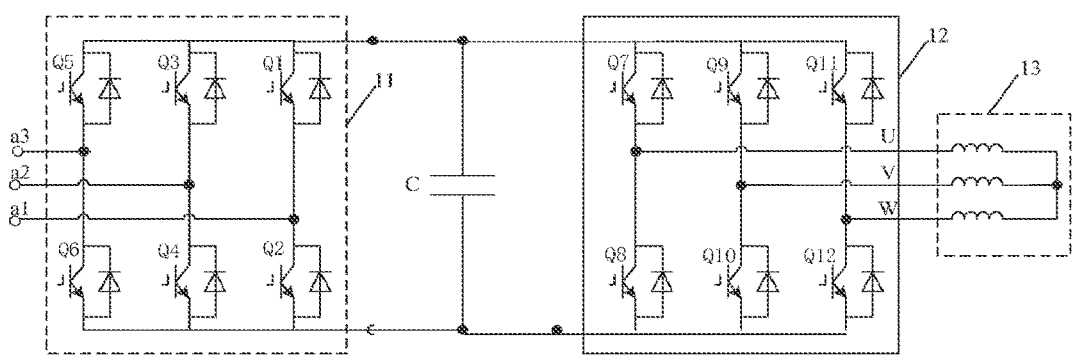
FIG. 4 is a structural view of a driving circuit in a series mode according to some embodiments of the present disclosure.

FIG. 4 is a structural view of a driving circuit in a series mode according to some embodiments of the present disclosure. As shown in FIG. 4, the rectifier unit 11 comprises a three-phase rectifier bridge circuit comprising a first rectifier bridge, a second rectifier bridge and a third rectifier bridge. The first rectifier bridge comprises a first transistor Q1 with a diode reversely in parallel inside and a second transistor Q2 with the same structure, and the circuit between the first transistor Q1 and the second transistor Q2 is connected to the first connection terminal a1. The second rectifier bridge comprises a third transistor Q3 and a fourth transistor Q4 which have the same structure as the first transistor Q1, and the circuit between the third transistor Q3 and the fourth transistor Q4 is connected to the second connection terminal a2. The third rectifier bridge comprises a fifth transistor Q5 and a sixth transistor Q6 which have the same structure as the first transistor Q1, and the circuit between the fifth transistor Q5 and the sixth transistor Q6 is connected to the third connection terminal a3. In the series mode, the first connection terminal a1 and the second connection terminal a2 are connected to the positive and negative poles of the DC power supply, and the third connection terminal a3 is floated.

As shown in FIG. 4, the inverter unit comprises a three-phase inverter bridge circuit comprising a first inverter bridge, a second inverter bridge, and a third inverter bridge. The inverter bridge comprises a seventh transistor Q7 with a diode reversely in parallel inside and an eighth transistor Q8 with the same structure, and the circuit between the seventh transistor Q7 and the eighth transistor Q8 is connected to the first phase line U. The second inverter bridge comprises a ninth transistor Q9 and a tenth transistor Q10 that have the same structure as the seventh transistor Q7, and the circuit between the ninth transistor Q9 and the tenth transistor Q10 is connected to the second phase line V. The third inverter bridge comprises an eleventh transistor Q11 and a twelfth transistor Q12 which have the same structure as the seventh transistor Q7, and the circuit between the eleventh transistor Q11 and the twelfth transistor Q12 is connected to the third phase line W. In the series mode, the first phase line U, the second phase line V and the third phase line W output three-phase alternating current to the load.

Figure 5:
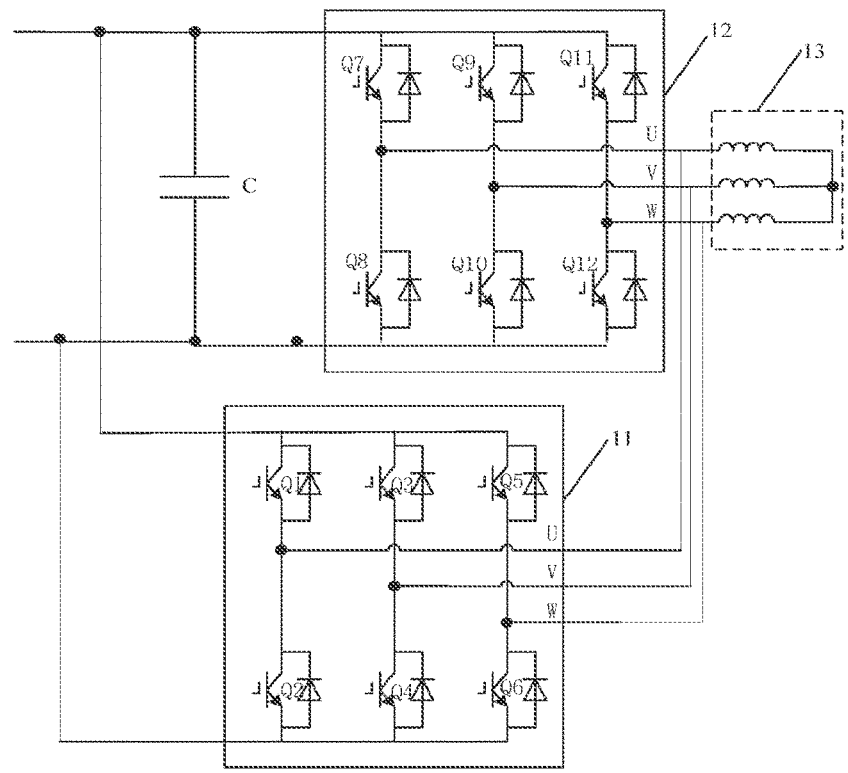
FIG. 5 is a structural view of a driving circuit in a parallel mode according to some embodiments of the present disclosure.

FIG. 5 is a structural view of a driving circuit in a parallel mode according to some embodiments of the present disclosure. As shown in FIG. 5, in the parallel mode, the input terminal of the rectifier unit 11 is connected to the DC power supply. After direct current is passed through the three-phase rectifier bridge, the first phase line U, the second phase line V, and the third phase line W output three-phase alternating current to the load. The first phase line U, the second phase line V and the third phase line W of the rectifier unit 11 are respectively three lines connecting to the first connection terminal a1, the second connection terminal a2 and the third connection terminal a3 of the first input terminal of the rectifier unit 11 in the series mode.

Figure 6:
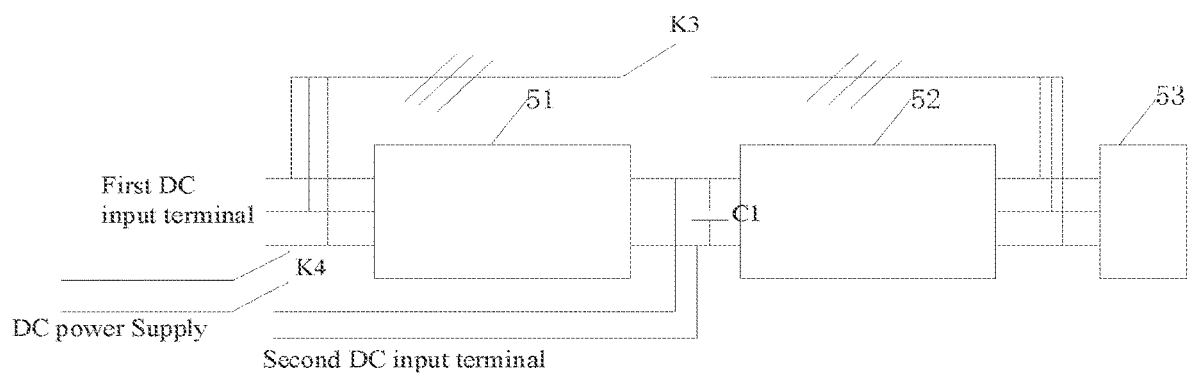
FIG. 6 is a structural view of a driving circuit according to still other embodiments of the present disclosure.

In some embodiments of the present disclosure, another driving circuit capable of switching a driving mode is provided. FIG. 6 is a structural view of a driving circuit according to still other embodiments of the present disclosure. As shown in FIG. 6, the driving circuit comprises: a rectifier module 51 (that is, the rectifier unit 11 in the above-described embodiments), an inverter module 52 (that is, the inverter unit 12 in the above-described embodiments), a motor load 53 (that is, the load 13 in the above-described embodiments), a mode switching switch K3 (and the first switch K1 in the above-described embodiments), a selection switch K4 (that is, the second switch K2 in the above-described embodiments), and a capacitor C1.

The rectifier module 51 comprises a first input terminal and an output terminal, so that the output terminal of the rectifier module 51 is connected to the input terminal of the inverter module 52, and the circuit between the rectifier module 51 and the inverter module 52 is connected to the second input terminal of the rectifier module 51. The output terminal of the inverter module 52 is connected to the load. The mode switching switch K3 is arranged between the first input terminal of the rectifier module 51 and the output terminal of the inverter module 52, and configured to control the driving circuit to switch between a series mode and a parallel mode by being switched on or off. The selection switch K4 is configured to implement that the DC power supply is alternatively connected to the first DC input terminal or the second DC input terminal of the rectifier module 51. The capacitor C1 is connected in parallel between the rectifier unit and the inverter unit, such that the capacitor C1 is charged by the rectifier module 51.

In some embodiments of the present disclosure, the idle rectifier module of the general frequency converter after DC input is utilized to form a standby inverter module or become a power voltage module in parallel to drive the motor load 53, and realize redundant backups or power sharing between modules. The motor load 53 is driven to form a driving circuit that supports parallel operation or has redundant inverter units. The working principles of this embodiment are as follows.

First of all, the intermediate capacitor is charged using the original structure of the frequency converter, and the structural change has to be performed after the charging of the intermediate capacitor is completely. This step specifically comprises: controlling the selector switch K4 to be thrown to the first DC input terminal, charging the capacitor C1 by the DC module 51, and generating a voltage at both ends of the capacitor C1 after the charging is completed.

Then, after the capacitor C1 generates a voltage, the selector switch K4 is switched from the first DC input terminal to the second DC input terminal, and the mode switching switch K3 is switched on to switch the driving circuit to the parallel mode.

After the mode switching is finished, the output terminal of the rectifier module 51 (that is, the first input terminal in the above-described embodiments) has been connected to the motor load 53; the rectifier module 51 and the inverter module form a parallel driving system or a redundant backup driving system.

In the above-mentioned embodiments of the present disclosure, the system driving mode is switched so that it is possible to rapidly change the AC input frequency converter to the DC input frequency converter without an idle rectifier module. The present disclosure is suitable for an AC input frequency-variable centrifuge and an AC input frequency-variable air-conditioner, as well as all the occasions where it is required to convert DC input to AC input by the frequency converter. The rectifier module in parallel operation which has the same function as the inverter module, can share a part of power of the inverter module, and supply power to the motor load through the redundant inverter module.

In some embodiments of the present disclosure, when one of the inverter modules is malfunctioned, the other inverter module immediately serves as a standby inverter module to supply power to the motor load, so as to realize the standby of the redundant inverter module.

In some embodiments of the present disclosure, a driving method is provided, wherein the driving method is applied to the driving circuit described in any of the above-mentioned embodiments (for example, any of the embodiments of FIGS. 2 to 6). The method comprises the steps of: controlling the second input terminal of the rectifier unit to be connected to the DC power supply; controlling the first input terminal of the rectifier unit be connected to the output terminal of the inverter unit so as to further control the driving circuit to switch to a parallel mode.

In some embodiments of the present disclosure, the driving method may further comprise: controlling the first input terminal of the rectifier unit to be connected to the DC power supply; controlling the first input terminal of the rectifier unit to be disconnected from the output terminal of the inverter unit so as to further control the driving circuit to switch to a series mode.

Figure 7:
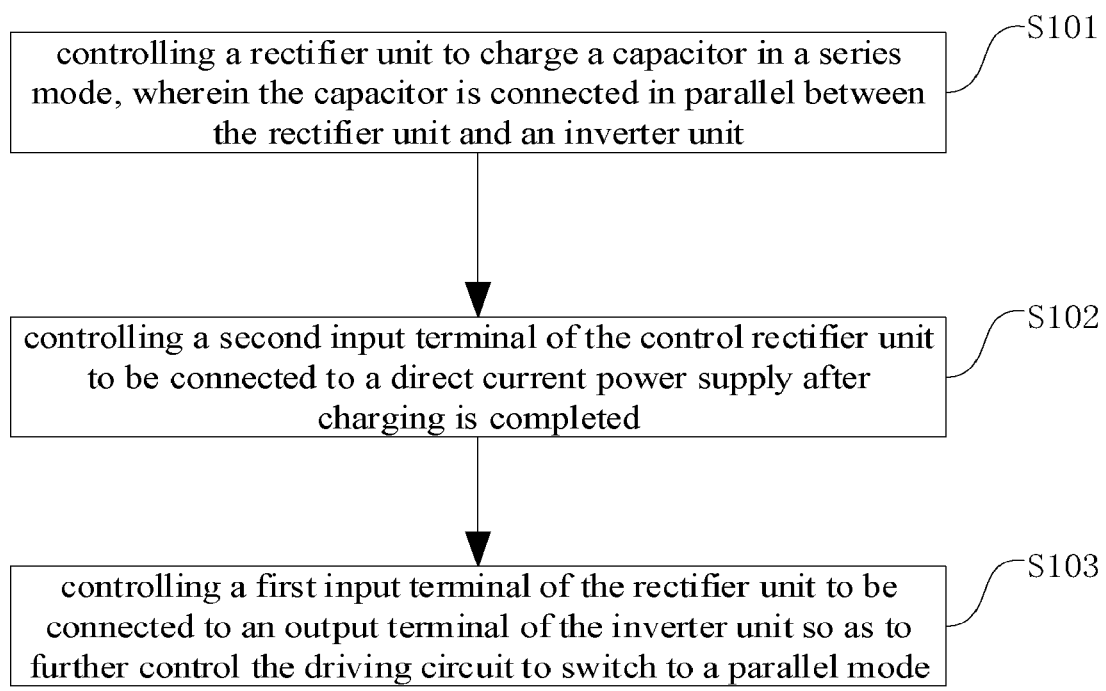
FIG. 7 is a flowchart of a driving method according to some embodiments of the present disclosure.

In some embodiments of the present disclosure, a driving method capable of switching a driving mode is also provided. FIG. 7 is a flowchart of a driving method according to some embodiments of the present disclosure, wherein the driving method is applied to the driving circuit described in any of the above-mentioned embodiments (for example, any of the embodiments of FIGS. 2 to 6). The method comprises the steps of S101 to S103.

S101: in the series mode, the rectifier unit is controlled to charge the capacitor; wherein the capacitor is connected in parallel between the rectifier unit and the inverter unit.

S102: after the charging is completed, the second input terminal of the rectifier unit is controlled to be connected to the DC power supply.

S103: the first input terminal of the rectifier unit is controlled be connected to the output terminal of the inverter unit so as to further control the driving circuit to switch to a parallel mode.

In order to implement charging the capacitor, in specific implementation, the step S101 comprises: controlling the first input terminal of the rectifier unit to be connected to the DC power supply so as to charge the capacitor. Specifically, the step of controlling the first input terminal of the rectifier unit to be connected to the DC power supply comprises: controlling the two poles of the second switch to be thrown to the first connection terminal a1 and the second connection terminal a2 of the first input terminal of the rectifier unit to control the first input terminal of the rectifier unit to be connected to the DC power supply, and further control direct current to be input to the rectifier unit through the first input terminal. The capacitor C is charged by the rectifier unit. At the same time, direct current is also output to the inverter unit through the output terminal of the rectifier unit, and then passed through the inverter unit such as to be converted into alternating current and output to the load, wherein, one terminal of the second switch is connected to the DC power supply, and the other terminal is alternatively connected to the first input terminal or the second input terminal of the rectifier unit.

In some specific embodiments of the present disclosure, in order to realize the switching of the two DC input terminals comprising the first input terminal and the second input terminal, the step S102 comprises: controlling the two poles of the second switch to be thrown to the fourth connection terminal b1 and the fifth connection terminal b2 of the second input terminal of the rectifier unit, so as to control the second input terminal of the rectifier unit to be connected to the DC power supply, and further control direct current to be input to the rectifier unit through the second input terminal. The direct current is output from the rectifier unit through the first input terminal, such as to be converted into an AC power supply through the rectifier unit and transmitted to the load, wherein, one terminal of the second switch is connected to the DC power supply, and the other terminal is alternatively connected to the first input terminal or the second input terminal of the rectifier unit.

In some specific embodiments of the present disclosure, in order to control the switching back and forth between a series mode and a parallel mode, the step S103 comprises: controlling the first switch to be switched on, wherein the first switch is arranged between the input terminal of the rectifier unit and the output terminal of the inverter unit.

In some specific embodiments of the present disclosure, in order to switch the driving circuit back to a series mode, after the first input terminal of the rectifier unit is controlled to be connected to the output terminal of the inverter unit so as to further control the driving circuit to switch to a parallel mode, the method further comprises: controlling the first switch to be switched off; controlling the first input terminal of the second rectifier unit to be connected to the DC power supply so as to further control the driving circuit to switch to a series mode, thereby realizing the switching from the parallel mode to the series mode.

In some embodiments of the present disclosure, a frequency converter comprising the driving circuit described in any of the above-described embodiments of the present disclosure is provided.

In some embodiments of the present disclosure, a device comprising a motor and further comprising the frequency converter described in any of the above-described embodiments of the present disclosure is also provided.

In some embodiments of the present disclosure, a computer-readable storage medium is also provided. The computer-readable storage medium has computer program instructions stored thereon, which, when executed by a processor, implement the steps of the driving method according to any of the above-mentioned embodiments.

The embodiments of the circuit described above are merely illustrative, and the units described as separate components may be physically independent or vice versa, and the components displayed as units may be physical units or vice versa. That is, they may be located in one place, or may also be distributed on a plurality of network units. Some or all of the modules therein may be selected according to actual needs to achieve the object of the solution of this embodiment.

It should be understood that, each part of the present disclosure may be implemented by hardware, software, firmware, or a combination thereof. In the above-described embodiments, a plurality of steps or methods may be implemented by software or firmware stored in a memory and executed by suitable instructions to run the system. For example, if it is implemented by hardware, as in another embodiment, it may be implemented by any of the following technologies known in the art or a combination thereof: a discrete logic circuit having a logical gate circuit for realizing a logic function over data signals, an application-specific integrated circuit having a suitable combined logic gate circuit, a programmable gate array (PGA), a field programmable gate array (FPGA), and the like.

Hitherto, the present disclosure has been described in detail. Some details well known in the art are not described in order to avoid obscuring the concept of the present disclosure. According to the above description, those skilled in the art would fully understand how to implement the technical solutions disclosed here.

Those of ordinary skill in the art may understand that all or some of the steps in the above-described embodiments may be accomplished by hardware, or by programs to instruct relevant hardware. The programs may be stored in a computer-readable storage medium. The storage medium as mentioned above may be read-only memory, magnetic disk or optical disk, and the like.

Descriptions of the present disclosure, which are made for purpose of exemplification and description, are not absent with omissions or limit the present disclosure to the forms as disclosed. Many modifications and variations are apparent for those skilled in the art. The embodiments are selected and described in order to better explain the principles and actual application of the present disclosure, and enable those skilled in the art to understand the present disclosure so as to design various embodiments adapted to particular purposes and comprising various modifications.

What is claimed is:

1. A driving circuit, comprising:
a rectifier unit comprising a first input terminal, a second input terminal and an output terminal, wherein the output terminal of the rectifier unit is connected to an input terminal of an inverter unit, and the second input terminal of the rectifier unit is connected to the input terminal of the inverter unit;
a first switch arranged between the first input terminal of the rectifier unit and an output terminal of the inverter unit, and configured to control the driving circuit to switch between a series mode and a parallel mode by being switched on or off;
the inverter unit with the output terminal connected to a load; and
a capacitor connected in parallel between the rectifier unit and the inverter unit,
wherein, in case where the first switch is switched on, the driving circuit is in the parallel mode, the rectifier unit and the inverter unit are connected in parallel, the second input terminal of the rectifier unit is a direct current input terminal, and the first input terminal of the rectifier unit is an alternating current output terminal, the rectifier unit has the same function as that of the inverter unit, and the rectifier unit is configured to convert the direct current to the alternating current.

2. The circuit according to claim 1, further comprising:
a second switch, wherein one terminal of the second switch is connected to a direct current power supply, and another terminal is alternatively connected to the first input terminal or the second input terminal of the rectifier unit.

3. The circuit according to claim 2, wherein the second switch is a double-pole double-throw switch.

4. The circuit according to claim 1, wherein the rectifier unit comprises a three-phase rectifier bridge circuit.

5. The circuit according to claim 1, wherein the inverter unit comprises a three-phase inverter bridge circuit.

6. A driving circuit, comprising:
a rectifier unit comprising a first input terminal, a second input terminal and an output terminal;
an inverter unit comprising an input terminal and an output terminal, wherein the input terminal of the inverter unit is connected to the output terminal and the second input terminal of the rectifier unit, and the output terminal of the inverter unit is connected to a load;
a first switch arranged between the first input terminal of the rectifier unit and the output terminal of the inverter unit, and configured to control the driving circuit to switch between a series mode and a parallel mode by being switched on or off; and a capacitor connected in parallel between the rectifier unit and the inverter unit, wherein, in a case where the first switch is switched on, the driving circuit is in the parallel mode, the rectifier unit and the inverter unit are connected in parallel, the second input terminal of the rectifier unit is a direct current input terminal, and the first input terminal of the rectifier unit is an alternating current output terminal, the rectifier unit has the same function as that of the inverter unit, and the rectifier unit is configured to convert the direct current to the alternating current.

7. A frequency converter, comprising the driving circuit according to claim 1.

8. A device comprising a motor, wherein the device further comprises the frequency converter according to claim 7.

9. A driving method applied to the driving circuit according to claim 1, wherein the method comprises:
controlling the rectifier unit to charge the capacitor in the series mode, wherein the capacitor is connected in parallel between the rectifier unit and the inverter unit;
controlling the second input terminal of the control rectifier unit to be connected to a direct current power supply after charging is completed; and
controlling the first input terminal of the rectifier unit to be connected to the output terminal of the inverter unit to further control the driving circuit to switch to the parallel mode,
wherein the controlling the first input terminal of the rectifier unit to be connected to the output terminal of the inverter unit so as to further control the driving circuit to switch to the parallel mode comprises: controlling the driving circuit to switch to the parallel mode in case where the first switch is switched on, wherein the rectifier unit and the inverter unit are connected in parallel, the second input terminal of the control rectifier unit is a direct current input terminal, and the first input terminal of the control rectifier unit is an alternating current output terminal, the rectifier unit has the same function as that of the inverter unit, and the rectifier unit is configured to convert the direct current to the alternating current.

10. The driving method according to claim 9, wherein the controlling the rectifier unit to charge the capacitor in the series mode comprises:
controlling the first input terminal of the rectifier unit to be connected the direct current power supply, so as to charge the capacitor.

11. The driving method according to claim 10, wherein the controlling the first input terminal of the rectifier unit to be connected to the output terminal of the inverter unit comprises:
controlling two poles of a second switch to be thrown to two connection terminals of the first input terminal of the rectifier unit, wherein one terminal of the second switch is connected to the direct current power supply, and another terminal is alternatively connected to the first input terminal or the second input terminal of the rectifier unit.

12. The driving method according to claim 9, wherein the controlling the second input terminal of the control rectifier unit to be connected to the direct current power supply after charging is completed comprises:
controlling two poles of a second switch to be thrown to two connection terminals of the second input terminal of the rectifier unit, wherein one terminal of the second switch is connected to the direct current power supply, and another terminal is alternatively connected to the first input terminal or the second input terminal of the rectifier unit.

13. The driving method according to claim 9, wherein the controlling the first input terminal of the rectifier unit to be connected to the output terminal of the inverter unit so as to further control the driving circuit to switch to the parallel mode comprises:
controlling the first switch to be switched on, wherein the first switch is arranged between the input terminal of the rectifier unit and the output terminal of the inverter unit.

14. The driving method according to claim 13, wherein after the controlling the first input terminal of the rectifier unit to be connected to the output terminal of the inverter unit to further control the driving circuit to switch to the parallel mode, the method further comprises:
controlling the first switch to be switched off; and
controlling the first input terminal of the first rectifier unit to be connected to the direct current power supply so as to further control the driving circuit to a series mode.

15. A driving method applied to the driving circuit according to claim 1, wherein the method comprises:
controlling the second input terminal of the rectifier unit to be connected to a direct current power supply; and
controlling the first input terminal of the rectifier unit to be connected to the output terminal of the inverter unit so as to further control the driving circuit to switch to the parallel mode,
wherein the controlling the first input terminal of the rectifier unit to be connected to the output terminal of the inverter unit so as to further control the driving circuit to switch to the parallel mode comprises: controlling the driving circuit to switch to the parallel mode in case where the first switch is switched on, wherein the rectifier unit and the inverter unit are connected in parallel, the second input terminal of the rectifier unit is a direct current input terminal, and the first input terminal of the rectifier unit is an alternating current output terminal, the rectifier unit has the same function as that of the inverter unit, and the rectifier unit is configured to convert the direct current to the alternating current.

16. The driving method according to claim 15, further comprising:
controlling the first input terminal of the rectifier unit to be connected to the direct current power supply; and
controlling the first input terminal of the rectifier unit to be disconnected from the output terminal of the inverter unit so as to further control the driving circuit to switch to the series mode.

17. A non-transitory computer-readable storage medium having a computer program stored thereon, wherein the program when executed by a processor implements a method comprising:
controlling a rectifier unit to charge a capacitor in a series mode, wherein the capacitor is connected in parallel between the rectifier unit and an inverter unit;
controlling a second input terminal of the control rectifier unit to be connected to a direct current power supply after charging is completed; and
controlling a first input terminal of the rectifier unit to be connected to an output terminal of the inverter unit to further control a driving circuit to switch to a parallel mode,
wherein the controlling the first input terminal of the rectifier unit to be connected to the output terminal of the inverter unit so as to further control the driving circuit to switch to the parallel mode comprises: controlling the driving circuit to switch to the parallel mode in case where a first switch is switched on, wherein the rectifier unit and the inverter unit are connected in parallel, the second input terminal of the control rectifier unit is a direct current input terminal, and the first input terminal of the control rectifier unit is an alternating current output terminal, the rectifier unit has the same function as that of the inverter unit, and the rectifier unit is configured to convert the direct current to the alternating current.

18. A non-transitory computer-readable storage medium having a computer program stored thereon, wherein the program when executed by a processor implements the method according to claim 15.

19. A frequency converter, comprising the driving circuit according to claim 6.

20. A device comprising a motor, wherein the device further comprises the frequency converter according to claim 19.

* * * * *